United States Patent
Opschoor et al.

(10) Patent No.: US 11,772,157 B2
(45) Date of Patent: Oct. 3, 2023

(54) ADDITIVE MANUFACTURING OF METAL OBJECTS

(71) Applicant: ADMATEC EUROPE B.V., Alkmaar (NL)

(72) Inventors: Jan Opschoor, Alkmaar (NL); Jacob Jan Saurwalt, Alkmaar (NL); Louis David Berkeveld, Schoorl (NL)

(73) Assignee: ADMATEC EUROPE B.V., Alkmaar (NL)

( * ) Notice: Subject to any disclaimer, the term of this patent is extended or adjusted under 35 U.S.C. 154(b) by 503 days.

(21) Appl. No.: 16/677,029

(22) Filed: Nov. 7, 2019

(65) Prior Publication Data

US 2020/0070242 A1 Mar. 5, 2020

Related U.S. Application Data

(63) Continuation of application No. PCT/NL2018/050306, filed on May 9, 2018.

(51) Int. Cl.
| | |
|---|---|
| *B22F 3/10* | (2006.01) |
| *B33Y 10/00* | (2015.01) |
| *B33Y 50/02* | (2015.01) |
| *B33Y 70/00* | (2020.01) |
| *B29C 64/124* | (2017.01) |

(Continued)

(52) U.S. Cl.
CPC ............ *B22F 3/1017* (2013.01); *B22F 1/107* (2022.01); *B22F 10/12* (2021.01); *B29C 64/124* (2017.08); *B29C 64/393* (2017.08); *B33Y 10/00* (2014.12); *B33Y 50/02* (2014.12); *B33Y 70/00* (2014.12); *C08K 3/08* (2013.01); *C08K 3/22* (2013.01);

(Continued)

(58) Field of Classification Search
None
See application file for complete search history.

(56) References Cited

U.S. PATENT DOCUMENTS

| | | |
|---|---|---|
| 1,835,024 A | 12/1931 | Driggs |
| 6,117,612 A | 9/2000 | Halloran et al. |
| | (Continued) | |

FOREIGN PATENT DOCUMENTS

| | | |
|---|---|---|
| CN | 106541129 A | 3/2017 |
| WO | WO9915293 A1 | 4/1999 |
| | (Continued) | |

OTHER PUBLICATIONS

International Search Report and Written Opinion issued in International Patent Application No. PCT/NL2018/050306, dated Aug. 13, 2018.

(Continued)

*Primary Examiner* — Colin W. Slifka
(74) *Attorney, Agent, or Firm* — Sunit Talapatra; Foley & Lardner LLP

(57) ABSTRACT

A radiation-curable slurry for additive manufacturing of 3D metal objects is provided, comprising: (a) 2-45 wt % of a polymerizable resin; (b) 0.001-10 wt % of one or more polymerization photoinitiators; and (c) 55-98 wt % of a mixture of metal-containing compounds, wherein the mixture of metal-containing compounds comprises, based on the weight of said mixture, 5-95 wt % of metal particles and 5-95 wt % of one or more metal precursors. An additive manufacturing method for producing a three-dimensional metal object using the slurry is provided, as well as three-dimensional metal objects obtainable by the method.

25 Claims, 1 Drawing Sheet

(51) Int. Cl.
*B29C 64/393* (2017.01)
*C08K 3/08* (2006.01)
*C08K 3/22* (2006.01)
*B22F 1/107* (2022.01)
*B22F 10/12* (2021.01)
*B29K 505/00* (2006.01)

(52) U.S. Cl.
CPC .. *B29K 2505/00* (2013.01); *C08K 2003/0887* (2013.01); *C08K 2003/2258* (2013.01)

(56) References Cited

U.S. PATENT DOCUMENTS

| | | | |
|---|---|---|---|
| 6,475,428 | B1 | 11/2002 | Fraval et al. |
| 2002/0176793 | A1 | 11/2002 | Moussa et al. |
| 2004/0081573 | A1 | 4/2004 | Newell |
| 2015/0337412 | A1 | 11/2015 | Jarvinen et al. |
| 2015/0337423 | A1 | 11/2015 | Martin et al. |

FOREIGN PATENT DOCUMENTS

| | | |
|---|---|---|
| WO | WO9964638 A1 | 12/1999 |
| WO | WO0162996 A1 | 8/2001 |
| WO | WO0240748 A1 | 5/2002 |
| WO | WO03048399 A2 | 6/2003 |
| WO | WO03076690 A1 | 9/2003 |
| WO | WO03092933 A1 | 11/2003 |
| WO | WO2006027612 A2 | 3/2006 |
| WO | WO2006037999 A2 | 4/2006 |
| WO | WO2006092615 A1 | 9/2006 |
| WO | WO2012066299 A1 | 5/2012 |
| WO | WO2014102223 A1 | 7/2014 |
| WO | WO2016097760 A1 | 6/2016 |
| WO | WO2017037165 A1 | 3/2017 |

OTHER PUBLICATIONS

"Solid Freeform Fabrication Proceedings: Sep. 1994", Solid Freeform Fabrication Symposium: 1994, Proceedings Aug. 8-10, 1994, Edited by Marcus et al., The University of Texas at Austin, Austin, Texas (439 pages).

Deckers et al., "Additive Manufacturing of Ceramics: A Review", Journal of Ceramic Science and Technology, vol. 5, No. 4, 2014, pp. 245-260 (16 pages).

Griffith et al., "Freeform Fabrication of Ceramics via Stereolithography", Journal of the American Ceramic Society, vol. 79, No. 10, 1996, pp. 2601-2608 (8 pages).

Halloran et al., "Photopolymerization of powder suspensions for shaping ceramics", Journal of the European Ceramic Society, vol. 31, 2011, pp. 2613-2619 (7 pages).

ns of the process according to the present invention are indirect

ADDITIVE MANUFACTURING OF METAL OBJECTS

FIELD OF THE INVENTION

The invention relates to a an additive manufacturing method, more particularly indirect stereolithography (SLA) or digital light processing (DLP), for the production of three-dimensional metal objects. The invention further relates to a slurry for use in said additive manufacturing method, to three-dimensional metal objects obtainable by said additive manufacturing method and to the use of the three-dimensional metal objects obtained as a catalyst or catalyst support.

BACKGROUND OF THE INVENTION

Additive manufacturing (AM) is a process, usually a layer-by-layer process, of joining materials to make objects from a three-dimensional computer-aided design (CAD) data model. The applications of additive manufacturing processes have been expanding rapidly over the last 20 years. Among additive manufacturing processes are material jetting, material extrusion, direct energy deposition, sheet lamination, binder jetting, powder bed fusion and photopolymerization. These technologies can all be applied to shape ceramic or metal components, starting from (sub)micrometer-sized ceramic or metal particles.

There are basically two different categories of AM processes: (i) single-step processes (also called 'direct' processes), in which three-dimensional objects are fabricated in a single operation wherein the geometrical shape and the material properties of the intended product are achieved simultaneously and (ii) multi-step processes (also called 'indirect' processes), in which three-dimensional objects are fabricated in two or more steps wherein the first step typically provides the basic geometric shape and the following steps consolidate the product to the intended material properties.

U.S. Pat. No. 6,117,612 discloses an example of an indirect layer-by-layer AM process for the production of ceramic and metal articles. U.S. Pat. No. 6,117,612 discloses photo-curable resins comprising ceramic particles with solids loadings in excess of 40 vol % and a viscosity of less than 3000 mPa·s and their use in multi-layer fabrication of green ceramic parts using stereolithography. The photo-curable resins can also contain sinterable metals.

WO03/092933A1 discloses a method for producing porous titanium 3D-articles comprising pressing a powder mixture containing titanium powder and 0.01-10 wt % titanium hydride into a predefined form and subsequently sintering the pressed powder mixture. The powder mixture can comprise an organic binder. WO03/092933A1 does not disclose AM techniques or photopolymerization.

US2015337423A1 discloses metal or metal alloy microparticles coated with metal hydride or metal alloy hydride nanoparticles as sintering aids. The microparticles are characterized by an average particle size between about 1 micron to about 1 millimeter and the nanoparticles are characterized by an average particle size less than 1 micron. US2015337423A1 describes solid articles containing the coated microparticles produced by AM techniques chosen from laser melting and electron beam melting. These AM techniques do not employ photopolymerization.

The present invention concerns an indirect layer-by-layer AM process which makes use of a sacrificial binder material to shape metal-containing particles into a three-dimensional metal object. Said binder material is obtained using photopolymerization of a polymerizable resin and a polymerization photoinitiator contained in a slurry which also contains the metal-containing particles. The binder material is removed in a subsequent 'debinding' treatment. Examples of the process according to the present invention are indirect stereolithography (SL or SLA), Digital Light Processing (DLP) and Large Area Maskless Photopolymerization (LAMP).

It is essential for indirect layer-by-layer AM processes that the depth of cure of the slurry is equal to or larger than the thickness of each layer such that the interface between the layers in sufficiently cured in order to provide the three-dimensional object containing the binder with sufficient mechanical strength. Hence, the penetration depth of the radiation that is used to initiate the polymerization reaction via the photoinitiator must be larger than the thickness of the layer.

The technical background related to depth of cure in stereolithographic processes for the manufacture of ceramic objects is described in the prior art. In this respect, reference is made to J. Deckers et al., Additive manufacturing of ceramics: A review, J. Ceramic Sci. Tech., 5 (2014), pp 245-260, to M. L. Griffith and J. W. Halloran, Freedom fabrication of ceramics via stereolithography, J. Am. Ceram. Soc., 79 (1996), pp 2601-2608, to J. W. Halloran et al., Photopolymerization of powder suspensions for shaping ceramics, J. Eur. Ceram. Soc., 31 (2011), pp 2613-2619, and to M. L. Griffith and J. W. Halloran, Ultraviolet curing of highly loaded ceramic suspensions for stereolithography of ceramics, manuscript for the Solid Freeform Fabrication Symposium 1994. These documents describe a relatively low depth of cure in highly loaded ceramic particle slurries.

The depth of cure depends amongst others upon the type of resin, the type and concentration of the photoinitiator, the dose of radiation used to initiate the polymerization reaction via the photoinitiator and the type and volume fraction of particles. Depth of cure heavily depends on scattering of the radiation by particles, the volume fraction of the particles and absorption of radiation by particles. A difference between the refractive indices of the particles and the medium carrying the particles, for example a photo-curable resin with a photoinitiator, may for example reduce the depth of cure since scattering is inversely proportional to the square of the difference in refractive indices. In this respect, reference is made to M. L. Griffith and J. W. Halloran, Freedom fabrication of ceramics via stereolithography, J. Am. Ceram. Soc., 79 (1996), pp 2601-2608.

The refractive index n of photo-curable resins typically lies between 1.3 and 1.7, such as for example 1.5. Many metals have a refractive index very different from 1.5. This means that depth of cure in slurries containing metal particles is limited by scattering of the radiation.

Absorption of radiation by the particles is related to the extinction coefficient or the imaginary part of the refractive index κ of the particles. Many (pure) metals have a high extinction coefficient or complex refractive index κ for radiation of a wavelength between 100 and 800 nm, i.e. the spectrum covering UV-, visible and IR-light.

Hence, the depth of cure in highly loaded metal particle slurries is often low, like in highly loaded ceramic particle slurries, which limits the applicability of stereolithography or related methods for the manufacturing of three-dimensional metal objects.

The present invention seeks to provide an improved method for additive manufacturing of three-dimensional metal objects based on indirect stereolithography or related methods. More in particular, the present invention seeks to provide a method for additive manufacturing of three-dimensional metal objects based on indirect stereolithography or related methods with an increased depth of cure.

SUMMARY OF THE INVENTION

The present inventors have found that the above objects can be met by an additive manufacturing method wherein a slurry is used comprising a polymerizable resin, one or more photoinitiators and a mixture of metal-containing compounds comprising metal particles and one or more metal precursors and wherein a three-dimensional object is built layer-by-layer which is subsequently processed into the indented three-dimensional metal object. The present inventors have established that many metal precursors have a refractive index n, for radiation of a given wavelength, that is closer to the refractive index of the polymerizable resin than to the refractive index of the corresponding metal. Moreover, many metal precursors have an extinction coefficient or complex refractive index κ that is lower than that of the corresponding metal, for radiation of a given wavelength. Hence, slurries comprising such metal precursors have increased penetration of radiation of said wavelength and higher depth of cure as compared to slurries only comprising particles of the corresponding metal.

Although one could replace all metal particles in the slurry by metal precursor, such an approach may result, after removing the organic binder and subsequently converting the one or more metal precursors to the corresponding metals, in a highly porous metal object with only limited mechanical strength. Subsequent sintering of such highly porous metal objects leads to considerable shrinkage, which may result in defects in the final three-dimensional metal object. The present inventors have found that by using a slurry comprising a polymerizable resin, one or more photoinitiators and a mixture of metal-containing compounds, said mixture comprising metal particles and one or more metal precursors, an improved depth of cure can be realized and three-dimensional metal objects having sufficient mechanical strength can be obtained.

Accordingly, the present invention provides a radiation-curable slurry for additive manufacturing of three-dimensional metal objects, said slurry comprising, based on the weight of the slurry:
a) 2-45 wt % of a polymerizable resin;
b) 0.001-10 wt % of one or more polymerization photoinitiators;
c) 55-98 wt % of a mixture of metal-containing compounds; wherein the mixture of metal-containing compounds comprises, based on the weight of said mixture, 5-95 wt % of metal particles and 5-95 wt % of one or more metal precursors.

In a second aspect, the present invention provides an additive manufacturing method for producing a three-dimensional metal object, said method comprising:
a) providing a CAD model of the three-dimensional metal object, said CAD model dividing the object in layers and the layers in voxels;
b) applying a first layer of radiation-curable slurry as defined hereinbefore as a layer to be processed onto a target surface;
c) scanning voxels of said first layer of radiation-curable slurry with radiation in accordance with the CAD model to cause polymerization of the polymerizable resin in the radiation-curable slurry to an organic binder;
d) applying a subsequent layer of radiation-curable slurry as defined hereinbefore as a layer on top of the first layer;
e) scanning voxels of said subsequent layer of radiation-curable slurry with radiation in accordance with the CAD model to cause polymerization of the polymerizable resin in the radiation-curable slurry to an organic binder;
f) repeating steps (d) and (e) wherein each time a subsequent layer is applied onto the previous layer to produce a green body;
g) removing the organic binder from the green body of step (f) to obtain a brown body;
h) optionally converting any remaining metal precursor in the brown body of step (g) to the corresponding metal.

The present invention further provides three-dimensional metal objects obtainable by the method according to the invention. Although three-dimensional metal objects can also be manufactured from metal powders using for example selective laser melting or electron-beam melting, the three-dimensional metal objects according to the present invention differ from those manufactured using state of the art techniques by a better performance of the object due to the stress-free and very homogeneous fine microstructure obtained.

In another aspect, the invention relates to the use of the three-dimensional metal objects obtained as a catalyst or catalyst support.

DEFINITIONS

The term 'indirect stereolithography', abbreviated as 'SL' or 'SLA', as used herein refers to a method to build three-dimensional metal objects through layer-by-layer curing of a radiation-curable slurry comprising a polymerizable resin, metal particles and one or metal precursors using irradiation controlled by Computer Aided Design (CAD) data from a computer. Although indirect stereolithography is usually performed using UV-radiation to initiate curing of the polymerizable resin, the process of 'indirect stereolithography' in the context of the present invention can also be performed using other types of radiation.

The term 'green body' as used herein refers to the three-dimensional object, obtained via indirect stereolithography, comprising metal, metal precursor and cured organic binder.

The term 'brown body' as used herein refers to the three-dimensional object obtained via indirect stereolithography ('green body') from which the organic binder is removed. The brown body can comprise metal and metal precursor but the metal precursor can also be completely converted to metal.

The term 'voxel' as used herein refers to a three-dimensional pixel.

The term 'Digital Light Processing', abbreviated as 'DLP', as used herein refers to an indirect stereolithographic method to build three-dimensional metal objects wherein each layer is patterned as a whole by exposure to radiation in the pattern of a bitmap defined by a spatial light modulator. DLP is also referred to in the art as 'Large Area Maskless Photopolymerization', abbreviated as 'LAMP'. Both terms are considered interchangeable. Although DLP and LAMP are usually performed using UV-radiation to initiate curing of the polymerizable resin, the processes of 'DLP' and 'LAMP' in the context of the present invention can also be performed using other types of radiation.

In the context of the present invention, the terms 'polymerization' and 'curing' are considered to be synonymous and are used interchangeably. Likewise, the terms 'polymerizable' and 'curable' are considered to be synonymous and are used interchangeably.

The term 'sintering' in the context of the present invention should be construed as a method of forming a more dense metal object out of a porous (less dense) metal object by heat and/or pressure without melting the entire mass. During sintering, the temperature is increased to the sintering temperature which is less than the melting temperature of the object. During this process, atoms at the surface of the porous metal object diffuse across the surface causing fusion of the metal resulting in a more dense material. This diffusion takes place within a range of temperatures below the melting temperature and is highest when the temperature is close to the melting temperature. It is within the skills of the artisan to choose appropriate sintering conditions. The metal may comprise more types of metal atoms. Hence, the term sintering also includes liquid-phase sintering in which at least one but not all metals are in a liquid state.

DETAILED DESCRIPTION

Figure 1:
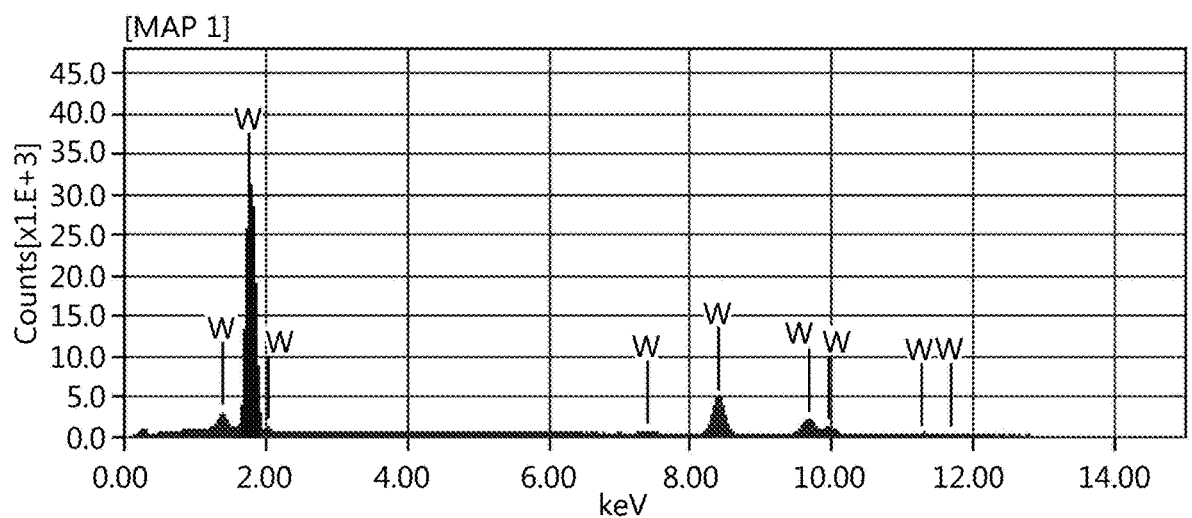
FIG. 1 depicts an EDS spectrum of a tungsten object obtained using a method representing the method according to the invention.

In a first aspect of the invention, a radiation-curable slurry for additive manufacturing of three-dimensional metal objects is provided, said slurry comprising, based on the weight of the slurry:
a) 2-45 wt % of a polymerizable resin;
b) 0.001-10 wt % of one or more polymerization photoinitiators;
c) 55-98 wt % of a mixture of metal-containing compounds;
wherein the mixture of metal-containing compounds comprises, based on the weight of said mixture, 5-95 wt % of metal particles and 5-95 wt % of one or more metal precursors.

In a preferred embodiment, the mixture of metal-containing compounds comprises, based on the weight of said mixture, 15-95 wt % of metal particles and 5-85 wt % of one or more metal precursors, more preferably 20-90 wt % of metal particles and 10-80 wt % of one or more metal precursors.

In another preferred embodiment, the mixture of metal-containing compounds comprises, based on the weight of said mixture, 45-95 wt % of metal particles and 5-55 wt % of one or more metal precursors, more preferably 65-95 wt % of metal particles and 5-35 wt % of one or more metal precursors, even more preferably 80-95 wt % of metal particles and 5-20 wt % of one or more metal precursors.

In still another preferred embodiment, the mixture of metal-containing compounds comprises, based on the weight of said mixture, 5-55 wt % of metal particles and 45-95 wt % of one or more metal precursors, more preferably 5-35 wt % of metal particles and 65-95 wt % of one or more metal precursors, even more preferably 5-20 wt % of metal particles and 80-95 wt % of one or more metal precursors.

In a preferred embodiment, the mixture of metal-containing compounds consists of, based on the weight of said mixture, 5-95 wt % of metal particles and 5-95 wt % of one or more metal precursors, more preferably 15-95 wt % of metal particles and 5-85 wt % of one or more metal precursors, even more preferably 20-90 wt % of metal particles and 10-80 wt % of one or more metal precursors.

In another preferred embodiment, the mixture of metal-containing compounds consists of, based on the weight of said mixture, 45-95 wt % of metal particles and 5-55 wt % of one or more metal precursors, more preferably 65-95 wt % of metal particles and 5-35 wt % of one or more metal precursors, even more preferably 80-95 wt % of metal particles and 5-20 wt % of one or more metal precursors.

In still another preferred embodiment, the mixture of metal-containing compounds consists of, based on the weight of said mixture, 5-55 wt % of metal particles and 45-95 wt % of one or more metal precursors, more preferably 5-35 wt % of metal particles and 65-95 wt % of one or more metal precursors, even more preferably 5-20 wt % of metal particles and 80-95 wt % of one or more metal precursors.

Preferably, the radiation-curable slurry as defined hereinbefore comprises 2.5-25 wt % of the polymerizable resin, more preferably 3-15 wt % of the polymerizable resin, even more preferably 4-10 wt % of the polymerizable resin.

The metal in the metal particles can be of a single type. In another embodiment, the metal particles comprise a mixture of different metal particles wherein each particle contains metal of a single type but different particles may contain metals of a different type. In still another embodiment, the metal particles comprise a mixture of metal alloy particles wherein each particle contains two or more different metals. In yet another embodiment, the metal particles comprise a mixture of (a) metal alloy particles wherein each particle contains two or more different metals and (b) metal particles wherein each particle contains metal of a single type but different particles may contain metals of a different type. Preferably, the metal particles substantially consist of metal. However, the metal particles may also contain up to 5 wt % of non-metallic inorganic components, such as for example the carbon in stainless steel.

In a preferred embodiment, the metal in the metal particles is chosen from the group consisting of beryllium, boron, magnesium, aluminium, silicon, scandium, titanium, vanadium, chromium, manganese, iron, cobalt, nickel, copper, zinc, germanium, yttrium, zirconium, niobium, molybdenum, hafnium, tantalum, tungsten, and the lanthanides including lanthanum, cerium, praseodymium, neodymium, samarium, and the actinides including actinium, thorium, protactinium, uranium, neptunium, plutonium, combinations thereof or metal alloys thereof. Preferred metal alloys are stainless steel, bronze and brass. Stainless steel is a metal alloy comprising iron, nickel, chromium and up to 1.2 wt % carbon. Bronze is a metal alloy comprising copper optionally with about 12% tin and often with the addition of other metals such as aluminium, manganese, nickel or zinc and sometimes non-metals or metalloids such as arsenic, phosphorus or silicon. Brass is a metal alloy made of copper and zinc.

In a more preferred embodiment, the metal in the metal particles is chosen from the group consisting of titanium, vanadium, chromium, manganese, iron, cobalt, nickel, copper, yttrium, zirconium, niobium, molybdenum, hafnium, tantalum, tungsten, neodymium, samarium, actinium, thorium, protactinium, uranium, and alloys thereof.

In an even more preferred embodiment, the metal in the metal particles is chosen from the group consisting of titanium, vanadium, chromium, manganese, iron, cobalt, nickel, copper, molybdenum, hafnium, tantalum, tungsten and metal alloys thereof. A very preferred metal alloy is stainless steel.

A metal precursor in the context of the invention is a chemical component that contains one or more metal atoms and one or more non-metal atoms and/or non-metal groups and that can be converted to the corresponding metal. The one or more non-metal groups can be inorganic or organic in nature.

The present inventors have established that many metal precursor particles have a refractive index n, for radiation of a given wavelength, that is closer to the refractive index of photo-curable resins than to the refractive index of the corresponding metal. Moreover, many metal precursor particles have an extinction coefficient or complex refractive index κ that is lower than that of the corresponding metal for radiation of a given wavelength. The present inventors have further established that many metal precursors that can be molecularly dissolved or colloidally distributed in the photo-curable resin hardly effect depth of cure. Hence, slurries comprising such metal precursors have increased penetration of radiation of said wavelength and higher depth of cure as compared to slurries only comprising particles of the corresponding metal. Examples of indices of refraction n and complex indices of refraction κ of several metal precursors and corresponding metals at wavelength A are given in Table 1.

TABLE 1

Index of refraction n and complex index of refraction κ at certain wavelengths λ of several metals and metal precursors

| Metal/precursor | n | K | λ (nm) |
|---|---|---|---|
| W | 3.23 | 2.53 | 390 |
| WO$_3$ | 1.67 | ~0 | |
| Mo | 3.74 | 3.59 | 667 |
| MoO$_3$ | 2.39 | 0.07 | 390 |
| Mg | 0.17 | 3.43 | 390 |
| MgO | 1.76 | ~0 | 390 |
| MgSO$_4$·7H$_2$O | 1.43 | ~0 | |

In an embodiment, the metal precursor takes the form of metal precursor particles. In another embodiment, the metal precursor is molecularly dissolved or colloidally distributed in the polymerizable resin. In still another embodiment, the metal precursor comprises a mixture of metal precursor particles and metal precursor which is molecularly dissolved or colloidally distributed in the polymerizable resin. Preferred examples of metal precursors that can be molecularly dissolved or colloidally distributed in the polymerizable resin are organometallic compounds such as metal carboxylates, acetates and formates and metal alkoxides.

The metal in the metal precursor can be of a single type. In other embodiments, mixtures of metal precursors containing different metals are employed. In case the metal precursor takes the form of metal precursor particles, a single metal precursor particle can contain metal precursors of different metals.

The metal in the one or more metal precursors is preferably chosen from the group consisting of beryllium, boron, magnesium, aluminium, silicon, scandium, titanium, vanadium, chromium, manganese, iron, cobalt, nickel, copper, zinc, germanium, yttrium, zirconium, niobium, molybdenum, hafnium, tantalum, tungsten, and the lanthanides including lanthanum, cerium, praseodymium, neodymium, samarium, and the actinides including actinium, thorium, protactinium, uranium, neptunium, plutonium and combinations thereof.

In a more preferred embodiment, the metal in the one or more metal precursors is chosen from the group consisting of titanium, vanadium, chromium, manganese, iron, cobalt, nickel, copper, yttrium, zirconium, niobium, molybdenum, hafnium, tantalum, tungsten, neodymium, samarium, actinium, thorium, protactinium, uranium, and combinations thereof.

In an even more preferred embodiment, the metal in the one or more metal precursors is chosen from the group consisting of titanium, vanadium, chromium, manganese, iron, cobalt, nickel, copper, molybdenum, hafnium, tantalum, tungsten, and combinations thereof.

Examples of metal precursors that can be used in the slurry as defined hereinbefore are chosen from the group consisting of metal oxides, metal hydroxides, metal sulfides, metal halides, organometallic compounds, metal salts, metal hydrides, metal-containing minerals and combinations thereof. Preferred examples of metal precursors that can be used in the slurry as defined hereinbefore are chosen from the group consisting of metal oxides, organometallic compounds, metal hydrides and combinations thereof. Most preferably, the metal precursor comprises a metal oxide.

Examples of preferred metal oxides are chosen from the group consisting of WO$_3$, NiO, MoO$_3$, ZnO and MgO. In a very preferred embodiment, the metal precursor is metal oxide WO$_3$.

Examples of preferred metal hydroxides are chosen from the group consisting of Mg(OH)$_2$, 4MgCO$_3$·Mg(OH)$_2$, Al(OH)$_3$, Zn(OH)$_2$, CuCO$_3$·Cu(OH)$_2$, 2CoCO$_3$·3Co(OH)$_2$, Al(OH)(CH$_3$COO)$_2$, Al(OH)(CH$_3$COO)$_2$·H$_2$O and combinations thereof.

An example of a preferred metal sulfide is MoS$_2$. Examples of preferred metal halides are WCl$_6$ and ZrCl$_4$.

Examples of preferred organometallic compounds are chosen from the group consisting of metal carboxylates, acetates, formates, hydrates thereof and combinations thereof.

In a more preferred embodiment, the metal precursor is an organometallic compound or hydrate thereof chosen from the group consisting of Mg(CH$_3$COO)$_2$, Mg(CH$_3$COO)$_2$·4H$_2$O, Fe(COOH)$_3$, Fe(COOH)$_3$·H$_2$O, Al(OH)(CH$_3$COO)$_2$, Al(OH)(CH$_3$COO)$_2$·H$_2$O, Cu(CH$_3$COO)$_2$, Cu(CH$_3$COO)$_2$·H$_2$O, Co(CH$_3$COO)$_2$, Co(CH$_3$COO)$_2$·H$_2$O, Co(CH$_3$CO)$_2$, Zn(CH$_3$COO)$_2$, Zn(CH$_3$COO)$_2$·2H$_2$O, Zn(COOH)$_2$, Zn(COOH)$_2$·2H$_2$O, Pb(CH$_3$COO)$_2$, Pb(CH$_3$COO)$_2$·2H$_2$O, Ti(C$_5$H$_7$O$_2$)$_4$, Ti[OCH(CH$_3$)$_2$]$_4$ and combinations thereof.

Examples of preferred metal salts are chosen from the group consisting of metal carbonates, oxalates, sulfates, hydrates thereof and combinations thereof.

In a more preferred embodiment, the metal salt is a metal carbonate, oxalate, sulfate or hydrate thereof chosen from the group consisting of MgCO$_3$, MgC$_2$O$_4$, MgC$_2$O$_4$·2H$_2$O, 4MgCO$_3$·Mg(OH)$_2$, MgSO$_4$·2H$_2$O, MnCO$_3$, MnC$_2$O$_4$, MnC$_2$O$_4$·2H$_2$O, NiCO$_3$, NiC$_2$O$_4$, NiC$_2$O$_4$·2H$_2$O, FeC$_2$O$_4$, FeC$_2$O$_4$·2H$_2$O, CuC$_2$O$_4$, CuCO$_3$·Cu(OH)$_2$, CoC$_2$O$_4$, CoC$_2$O$_4$·2H$_2$O, 2CoCO$_3$·3Co(OH)$_2$, ZnC$_2$O$_4$, ZnC$_2$O$_4$·2H$_2$O, PbC$_2$O$_4$, PbCO$_3$ and combinations thereof.

Preferred examples of metal hydrides are titanium hydride, zirconium hydride, magnesium hydride, vanadium hydride, tantalum hydride and hafnium hydride. In a more preferred embodiment, the metal precursor is a metal hydride chosen from the group consisting of TiH$_2$, MgH$_2$ and TaH$_5$.

Preferred examples of metal-containing minerals are chosen from the groups consisting of rutile, ilmenite, anatase, and leucoxene (for titanium), scheelite (tungsten), cassiterite (tin), monazite (cerium, lanthanum, thorium), zircon (zirconium hafnium and silicon), cobaltite (cobalt), chromite (chromium), bertrandite and beryl (beryllium, aluminium, silicon), uranite and pitchblende (uranium), quartz (silicon), molybdenite (molybdenum and rhenium), stibnite (antimony) and combinations thereof. The metal contained in the mineral is indicated within brackets.

In a very preferred embodiment, a slurry as defined hereinbefore is provided wherein the metal precursor and the metal particles contain a single metal. Examples of this very preferred embodiment are slurries as defined hereinbefore comprising:
a) Ti metal particles and $TiH_2$ metal precursor particles;
b) Ti metal particles and titanium(IV)acetylacetonate (Ti $(C_5H_7O_2)_4$) metal precursor;
c) Ti metal particles and titanium alkoxide, such as titanium (IV)isopropoxide $(Ti[OCH(CH_3)_2]_4)$, metal precursor;
d) W metal particles and $WO_3$ metal precursor particles;
e) Ta metal particles and $TaH_5$ metal precursor particles;
f) Hf metal particles and $HfH_2$ metal precursor particles.

In another preferred embodiment, the metal precursor and the metal particles contain a different metal. Examples of this very preferred embodiment are slurries as defined hereinbefore comprising:
a) Stainless steel metal particles and $TiH_2$-metal precursor particles;
b) WC metal particles with cobaltoxide precursor particles.

The polymerizable resin comprises monomers, oligomers or combinations thereof. In a preferred embodiment, the polymerizable resin comprises radically polymerizable monomers, oligomers or combinations thereof chosen from the group consisting of acrylates, (aliphatic) urethane acrylates, vinyl ethers, allyl ethers, maleimides, thiols and mixtures thereof. In another preferred embodiment, the polymerizable resin comprises cationically polymerizable monomers, oligomers or combinations thereof chosen from the group consisting of epoxides, vinyl ethers, allyl ethers, oxetanes and combinations thereof. Naturally, radically polymerizable resins are to be combined with one or more radical polymerization photoinitiators and cationically polymerizable resins are to be combined with one or more cationic polymerization photoinitiators.

The stability and strength of the sacrificial organic binder that is formed after polymerization of the polymerizable resin can be increased by using cross-linking monomers and/or oligomers. Cross-linking monomers and/or oligomers have two or more reactive groups.

Photoinitiators for radical polymerization and cationic polymerization are well-known in the art. Reference is made to J. P. Fouassier, J. F. Rabek (ed.), *Radiation Curing in Polymer Science and Technology: Photoinitiating systems*, Vol. 2, Elsevier Applied Science, London and New York 1993, and to J. V. Crivello, K. Dietliker, Photoinitiators for Free Radical, Cationic & Anionic Photopolymerization, 2nd Ed., In: *Surface Coating Technology*, Editor: G. Bradley, Vol. III, Wiley & Sons, Chichester, 1999, for a comprehensive overview of photoinitiators. It is within the skills of the artisan to match the type of polymerizable resin, the type of radiation and the one or more photoinitiators used in the slurry. In a preferred embodiment, the radiation-curable slurry as defined hereinbefore comprises 0.1-4 wt % of one or more polymerization photoinitiators.

It is important that polymerization of the slurry can be controlled when particular portions of the slurry are exposed to radiation. Furthermore, the slurry should have a certain storage stability. To this end, the slurry can further comprise 0.001-1 wt % of one or more polymerization inhibitors or stabilizers based on the total weight of the slurry, preferably 0.002-0.5 wt %. The polymerization inhibitors or stabilizers are preferably added in such an amount that the slurry is storage stable over a period of 6 months. A slurry is considered storage stable if the viscosity increase is less than 10% over a period of 6 months. Examples of suitable polymerization inhibitors or stabilizers for a radically polymerizable resin are phenols, hydroquinones, phenothiazine and TEMPO. Examples of suitable polymerization inhibitors or stabilizers for a cationically polymerizable resin are compounds containing alkaline impurities, such as amines, and/or sulfur impurities.

The particle size and the particle size distribution of the metal particles, and metal precursor particles if at least part of the metal precursor takes the form of particles, are important parameters since they influence, among other things, slurry viscosity, maximum particle load in the slurry and scattering of the radiation.

One standard way of defining the particle size distribution in a sample of particles is to refer to $D_{10}$, $D_{50}$ and $D_{90}$ values, based on a volume distribution. $D_{10}$ is the particle diameter value that 10% of the population of particles lies below. $D_{50}$ is the particle diameter value that 50% of the population lies below and 50% of the population lies above. $D_{50}$ is also known as the median particle size value. $D_{90}$ is the particle diameter value that 90% of the population lies below. A powder that has a wide particle size distribution will have a large difference between the $D_{10}$ and $D_{90}$ values. Likewise, a powder that has a narrow particle size distribution will have a small difference between the $D_{10}$ and $D_{90}$ values. Particle size distributions, including $D_{10}$, $D_{50}$ and $D_{90}$ values, may be determined by laser diffraction, for example using a Malvern Mastersizer 3000 laser diffraction particle size analyzer.

Preferably, the metal particles that can be used in the slurry as defined hereinbefore have a particle size distribution as determined by laser diffraction that can be characterized by $D_{10}$, $D_{50}$ and $D_{90}$ values of 3 μm, 6 μm and 9 μm, respectively.

In a preferred embodiment, the metal particles have a particle size distribution as determined by laser diffraction characterized in that the $D_{90}$ diameter of the metal particles is no more than 200% greater than the $D_{10}$ diameter of the metal particle, more preferably no more than 150% greater than $D_{10}$, even more preferably no more than 100% greater than $D_{10}$. It may be beneficial if the metal particles have a narrow size distribution in which $D_{90}$ is no more than 75% greater than $D_{10}$ or no more than 50% greater than $D_{10}$.

In preferred embodiments, the metal precursor particles, if at least part of the metal precursor takes the form of particles, have a particle size and particle size distribution as defined hereinbefore in the context of the metal particles. The particle size and particle size distribution of the metal precursor particles can be chosen independently from the particle size and particle size distribution of the metal particles.

In a more preferred embodiment, the metal precursor particles are smaller than the metal particles. In a very preferred embodiment, the metal precursor particles have a particle size distribution as determined by laser diffraction that can be characterized by $D_{10}$, $D_{50}$ and $D_{90}$ values of 1 μm, 3 μm and 5 μm, respectively.

A high volume fraction of metal particles, and metal precursor particles if at least part of the one or more metal precursors takes the form of particles, results in a high viscosity. In this respect, reference is made to J. Deckers et al., Additive manufacturing of ceramics: A review, *J. Ceramic Sci. Tech.*, 5 (2014), pp 245-260, and to M. L. Griffith and J. W. Halloran, Ultraviolet curing of highly loaded ceramic suspensions for stereolithography of ceramics, manuscript for the Solid Freeform Fabrication Symposium 1994, describing that the viscosity of suspensions highly loaded with interacting particles is positively related to the volume fraction of the particles. Naturally, a proper rheology of the slurry is required to be able to apply thin layers of the slurry onto a substrate and on top of each other. The inventors have found that suitable values for the volume fraction of metal and metal precursor particles and the viscosity of the slurry are as follows.

The highest possible volume fraction for mono-disperse particles is 0.74. The volume fraction of metal particles, and metal precursor particles if at least part of the one or more metal precursors takes the form of particles, in the slurry according to the invention is preferably between 0.10 and 0.70, more preferably between 0.15 and 0.65, even more preferably between 0.30 and 0.60.

The viscosity of the radiation-curable slurry as defined hereinbefore measured in accordance with ASTM D2196-15 (2015) at 20° C. at a shear rate between 10 $s^{-1}$ and 100 $s^{-1}$ using a plate-plate rheometer is preferably between 0.01 and 50 Pa·s, more preferably between 0.05 and 40 Pa·s, even more preferably between 0.1 and 35 Pa·s.

In a second aspect of the invention, an additive manufacturing method for producing a three-dimensional metal object is provided, said method comprising:
a) providing a CAD model of the three-dimensional metal object, said CAD model dividing the object in layers and the layers in voxels;
b) applying a first layer of radiation-curable slurry as defined hereinbefore as a layer to be processed onto a target surface;
c) scanning voxels of said first layer of radiation-curable slurry with radiation in accordance with the CAD model to cause polymerization of the polymerizable resin in the radiation-curable slurry to an organic binder;
d) applying a subsequent layer of radiation-curable slurry as defined hereinbefore as a layer on top of the first layer;
e) scanning voxels of said subsequent layer of radiation-curable slurry with radiation in accordance with the CAD model to cause polymerization of the polymerizable resin in the radiation-curable slurry to an organic binder;
f) repeating steps (d) and (e) wherein each time a subsequent layer is applied onto the previous layer to produce a green body;
g) removing the organic binder from the green body of step (f) to obtain a brown body;
h) optionally converting any remaining metal precursor in the brown body of step (g) to the corresponding metal.

In a preferred embodiment, the radiation used in steps (c) and (e) of the method is actinic radiation. Preferred types of actinic radiation are UV-radiation, visible light and IR-radiation. Preferred UV-radiation has wavelengths between 10 and 380 nm, more preferably between 250 and 350 nm. Visible light has a wavelength between 380 and 780 nm. As will be appreciated by those skilled in the art, the one or more polymerization photoinitiators in the slurry must be responsive to the type of radiation applied. It is within the skills of the artisan to match photoinitiators with the spectral output of the radiation source.

The scanning of the voxels of the slurry layers in steps (c) and (e) in accordance with the CAD model can be performed voxel-by-voxel with one or more scanning lasers. Hence, in an embodiment, the additive manufacturing method as defined hereinbefore is an indirect stereolithographic (SLA) method for producing a three-dimensional metal object wherein scanning of the voxels of the slurry layers in steps (c) and (e) in accordance with the CAD model is performed voxel-by-voxel.

It is also possible to perform the scanning of the voxels of the slurry layers in steps (c) and (e) in accordance with the CAD model by simultaneously exposing all voxels in the layer to radiation through a mask. This mask defines the pattern of the specific layer to be cured in accordance with the CAD model. Thus, in an embodiment of the invention, the scanning of the voxels of the slurry layers in steps (c) and (e) in accordance with the CAD model is performed by simultaneously exposing all voxels in the layer to radiation through a mask.

The scanning of the voxels of the slurry layers in steps (c) and (e) can also be performed by simultaneously exposing all voxels in the layer to radiation using a spatial light modulator such as a light engine or a beamer. This spatial light modulator projects a radiation pattern onto the layer such that voxels are cured in accordance with the CAD model. Hence, in a preferred embodiment, the additive manufacturing method as defined hereinbefore is a Dynamic Light Processing (DLP) method for producing a three-dimensional metal object wherein scanning of the voxels of the slurry layers in steps (c) and (e) is performed by simultaneously exposing all voxels in the layer to radiation.

The three-dimensional object comprising the sacrificial organic binder, i.e. the green body obtained in step (f), is subjected to debinding in step (g) to remove the organic binder. The binder can be removed by heating the green body, typically to a temperature of between 90 and 600° C., more preferably to a temperature between 100 and 450° C. In the debinding step (g), purely thermal as well as thermo-chemical processes may take place. The debinding step can be performed by oxidation or combustion in an oxygen-containing atmosphere. Preferably, the debinding step is however performed as a pyrolysis step in the absence of oxygen. The debinding step can further be performed in a protective or hydrogen-containing environment.

Before heating the green body obtained in step (f), it can optionally be treated with a solvent to separate the green body from uncured slurry and/or to extract elutable organic components. Depending on the solubility of the elutable components, this solvent can be either aqueous or organic in nature. Examples of organic solvents that can be used are acetone, trichloroethane, heptanes and ethanol.

The debinding in step (g) can also remove at least part or all of the organic part of an organo-metallic metal precursor. Decomposed organo-metallic metal precursor may result in reactive metal components on the surface of the metal particles, inducing favorable sintering reactions to produce a brown body having increased mechanical strength. Hence, debinding step (g) may effectively be a sintering step wherein metal precursor is converted to the corresponding metal, making optional step (h) redundant.

In case metal hydride particles with a low decomposition temperature, such as for example $TiH_2$ or $ZrH_2$, are used as metal precursor particles, the debinding in step (g) may result in decomposition of the metal hydride into hydrogen, free hydride ions and metal. This metal from the decomposed metal hydrides is deposited onto the surface of the metal particles 'connecting' the metal particles together. Hence, metal hydride particles with a low decomposition temperature can act as a sintering aid for metal particles during the debinding in step (g). Hence, decomposition of the metal hydride during debinding step (g) may make optional step (h) redundant.

Most metals, like for example titanium and chromium, iron, tungsten and molybdenum, are subject to oxidation. Such metals develop a metal oxide layer when exposed to oxygen-containing environments, particularly at high temperature, which results in an impaired sinterability of the corresponding metal particles. Without wishing to be bound by theory, it is believed that the hydrogen and/or free hydride ions that are formed during decomposition of metal hydride particles can result in a reducing environment and an oxide displacement reaction resulting in improved sintering of metal particles having a metal oxide layer. In such a case, there is less need of performing the debinding step (g) in a protective or hydrogen-containing environment.

As explained above, in those cases wherein the metal precursor already fully decomposes forming new metal during the debinding step (g), the optional step (h) of converting any remaining metal precursor in the brown body of step (g) is redundant. If, on the other hand, the metal precursor does not fully decompose during the debinding step (g) or if the metal precursor remains fully intact during the debinding step (g), step (h) wherein any remaining metal precursor is converted to the corresponding metal is preferably performed. Hence, in some preferred embodiments, after removal of the organic binder in step (g) new metal is formed in step (h) by the conversion of the metal precursor to the corresponding metal. This new-formed metal acts as metallic binder and/or creates more sinter-activity for the original metal particles such that a porous brown body is formed having improved mechanical strength as compared to the corresponding green body.

The conversion method of step (h) wherein one or more metal precursors are converted to the corresponding metals depends on the type of metal precursor. This step can be performed using methods known in the art. It will be appreciated by those skilled in the art that more than one of the following methods may be required if there is more than one type of metal precursor.

For example, reference is made to the electro-decomposition or electro-deoxidation process as described in WO99/64638A1. In this process, which is called the 'FFC process' in the art, a solid compound such as for example a metal oxide, is arranged in contact with a cathode in an electrolysis cell comprising a fused salt. A potential is applied between the cathode and an anode of the cell such that the compound is reduced. The inventors have found that this process can also be used to convert the metal precursor in the brown body obtained in step (g) to the corresponding metal. Further reference is made to modifications of the 'FFC process' as described in WO01/62996A1, WO02/40748A1, WO03/048399A2, WO03/076690A1, WO2006/027612A2, WO2006/037999A2, WO2006/092615A1, WO2012/066299A1 and WO2014/102223A1. The principle of the 'FFC process' can be used to reduce brown bodies comprising metal precursors such as oxides of beryllium, boron, magnesium, aluminium, silicon, scandium, titanium, vanadium, chromium, manganese, iron, cobalt, nickel, copper, zinc, germanium, yttrium, zirconium, niobium, molybdenum, hafnium, tantalum, tungsten, and the lanthanides including lanthanum, cerium, praseodymium, neodymium, samarium, and the actinides including actinium, thorium, protactinium, uranium, neptunium and plutonium to the corresponding metals.

The principle of the 'FFC process' can further be used to reduce brown bodies comprising metal precursors in the form of oxides of several metal-containing minerals that may be found in naturally occurring sands and oxide ores including rutile, ilmenite, anatase, leucoxene, scheelite, cassiterite, monazite, zircon, cobaltite, chromite, bertrandite, beryl, uranite, pitchblende, quartz, molybdenite and stibnite.

Alternatively, brown bodies comprising metal precursors in the form of metal oxide can be converted to the corresponding porous metal brown bodies by reducing the metal oxides with hydrogen gas at a temperature of between 700 and 800° C. This is the preferred route for metal oxides that volatilize at temperatures of above 800° C., such as for example $MoO_3$ and $WO_3$. Note that the debinding step and the conversion step of metal oxide brown bodies using hydrogen gas can be combined by raising the temperature when the debinding step is also performed in a hydrogen-containing atmosphere.

The conversion of brown bodies comprising metal precursors in the form of metal hydride to the corresponding metal brown bodies can conveniently take place using a thermal step. In this respect, reference is made to the dehydride step in the well-known Hydride-Dehydride (HDH) process as described in for example U.S. Pat. Nos. 1,835,024 and 6,475,428. In this dehydride step, hydrogen is removed from for example titanium, zirconium, vanadium and tantalum hydride, by heating the hydride under high vacuum. As explained above, this conversion step in only expedient if the metal hydride not already fully decomposes during debinding step (g).

The conversion of brown bodies comprising metal precursors such as metal hydroxides, metal salts, like metal carbonates and oxalates, and organometallic compounds such as carboxylates, acetates and formates to the corresponding metal brown bodies can conveniently take place using a two-step process. In a first step, the metal hydroxide, metal salt, and/or organometallic compounds in the brown body are thermally decomposed to a metal oxide. In this respect reference is made to J. Mu and D. D. Perlmutter, Thermal decomposition of carbonates, carboxylates, oxalates, acetates, formates, and hydroxides, *Thermochimica Acta,* 49 (1981), pp 207-218, disclosing decomposition temperatures of metal carbonates, carboxylates, oxalates, acetates, formates, and hydroxides and the resulting metal oxides. In a second step, the brown body comprising metal oxides is converted to the corresponding metal brown body using the principle of the 'FFC process' as described hereinbefore or by reducing the metal oxides with hydrogen gas at a temperature of between 700 and 800° C. As explained above, in the case of organometallic compounds as metal precursors, this conversion step is only expedient if the organometallic compounds not already fully decompose forming new metal during debinding step (g).

The conversion of brown bodies comprising metal sulphides and/or metal halides to the corresponding metal brown bodies can also conveniently take place using a two-step process. In a first step, the metal sulphides and/or metal halides in the brown body are converted to a metal oxide, for example by heating under oxygen-rich conditions. In a second step, the brown body comprising metal oxides is converted to the corresponding metal brown body using the principle of the 'FFC process' as described hereinbefore or the brown body comprising metal oxides is converted to the corresponding metal brown body via reduction with hydrogen gas at a temperature of between 700 and 800° C.

Step (h) wherein new metal is formed by conversion of the metal precursor to the corresponding metal results in a porous brown body having improved mechanical strength as compared to the corresponding green body.

The mechanical strength of the porous metal brown bodies obtained in step (g) or in step (h) can be further increased by sintering the porous brown body. Hence, in a preferred embodiment, the porous brown body obtained in step (g), when step (h) is not performed, or in step (h) is sintered in a subsequent step (i).

Sintering results in compacting and solidifying of the porous structure of the brown body, whereby the body becomes smaller and gains strength. Sintering typically takes place at temperatures below the melting temperature of the metal or alloy. The sintering temperature or sintering temperature range typically varies between 0.6 and 0.9 of the melting temperature. The sintering step may encompass more than one temperature cycle to avoid thermal shocks which may lead to breakage of the three-dimensional metal object.

If the porous brown body obtained in step (g) or in step (h) contains a single metal, the sintering temperature is below the melting temperature of the pure metal.

If the porous brown body obtained in step (g) or in step (h) contains different metals and/or a metal alloy, the sintering temperature is below the lowest melting temperature of the pure metals and below the maximum melting temperature of the metal alloy, preferably below the lowest melting temperature of the pure metals and below the minimum melting temperature of the metal alloy.

In another embodiment wherein the porous brown body obtained in step (g) or in step (h) contains different metals and/or a metal alloy and the phase diagram of the overall metal composition shows a eutectic melting temperature, the sintering temperature is below the eutectic melting temperature.

In still another embodiment wherein porous brown body obtained in step (g) or in step (h) contains different metals and/or a metal alloy and the phase diagram of the overall metal composition shows a peritectic decomposition temperature, the sintering temperature is below the peritectic decomposition temperature.

In a still further embodiment wherein the porous brown body obtained in step (g) or in step (h) contains different metals and/or a metal alloy and the phase diagram of the overall metal composition shows one or more peritectic decomposition temperatures and one/or one or more eutectic melting temperatures, the sintering temperature preferably is below all these temperatures.

It is within the skills of the artisan to choose an appropriate sintering temperature. Melting temperatures of pure metals, eutectic melting temperatures of metal mixtures and peritectic decomposition temperatures of metal mixtures are known in the art. In this respect, reference is made to MatWeb (www.matweb.com), an online database of material properties.

Many metals are subject to oxidation when exposed to high temperatures. The metal oxide layer thus formed results in an impaired sinterability. Moreover, the oxides of some metals are subject to sublimation far below the sintering temperature. The sintering temperature of pure tungsten is >2000° C. Tungsten oxidizes when it comes in contact with oxygen-containing gas such as air. Above temperatures of 600° C., the oxide $WO_3$ is formed. At temperatures above 750° C., sublimation of $WO_3$ takes place. The same holds true for molybdenum. The sintering temperature of pure molybdenum is >2000° C. When molybdenum is heated in air to above 600° C., volatile molybdenum oxides are formed. Hence, heating to above these temperatures in oxygen-containing environments leads to loss of metal. Sintering is therefore preferably carried out in an inert of vacuum environment, such as under argon, helium or $CO_2$ gas, or in a reducing environment such as under hydrogen or CO gas.

In a preferred embodiment, the thickness of the first and subsequent layers of slurry applied in steps (b) and (d) is between 5 and 300 µm, more preferably between 6 and 200 µm, still more preferably between 7 and 100 µm, even more preferably between 8 and 50 µm, most preferably between 9 and 20 µm.

A third aspect of the invention concerns a three-dimensional metal object obtainable by the methods as defined hereinbefore. The three-dimensional metal objects according to the present invention differ from those manufactured using state of the art techniques by a better performance of the object due to the stress-free and very homogeneous microstructure.

In an embodiment of the invention, the metal particles and the metal precursor as defined hereinbefore only contain a single type of metal atom in which case the additive manufacturing method for producing a three-dimensional metal object as defined hereinbefore results in a pure metal object, preferably a titanium object or a tungsten object.

In another embodiment, the metal particles and the one or more metal precursors as defined hereinbefore contain two or more types of metal atoms in which case the additive manufacturing method for producing a three-dimensional metal object as defined hereinbefore results in a metal alloy object.

In a further embodiment, different slurries are applied in different layers, wherein the metal particles and metal precursor in each slurry comprise a different type of metal atoms, in which case the additive manufacturing method for producing a three-dimensional metal object as defined hereinbefore results in a composite metal object comprising different layers of pure metals.

In a still further embodiment, different slurries are applied in different layers, wherein the metal particles and metal precursor in each slurry comprise two or more types of metal atoms and wherein the metal compositions of the metal precursor particles in the different slurries is not identical, in which case the additive manufacturing method for producing a three-dimensional metal object as defined hereinbefore results in a composite metal object comprising different alloys in different layers. Composite three-dimensional metal objects comprising pure metals and alloys are also envisaged.

A preferred embodiment concerns a three-dimensional metal object obtainable by the method of step (a) to (g), optionally step (a) to step (h), as defined hereinbefore.

Another preferred embodiment concerns a three-dimensional metal object obtainable by the method of step (a) to (g) followed by step (i), optionally step (a) to step (i), as defined hereinbefore.

The porous three-dimensional metal objects obtainable by the methods as defined hereinbefore may find application in the field of catalysis or may themselves be applied as catalysts. A fourth aspect of the invention therefore concerns the use of the three-dimensional metal objects obtained via the methods as defined hereinbefore as a catalyst or catalyst support.

Thus, the invention has been described by reference to certain embodiments discussed above. It will be recognized that these embodiments are susceptible to various modifications and alternative forms well known to those of skill in the art.

Furthermore, for a proper understanding of this document and its claims, it is to be understood that the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

All patent and literature references cited in the present specification are hereby incorporated by reference in their entirety.

The following examples are offered for illustrative purposes only, and are not intended to limit the scope of the present invention in any way.

EXAMPLES

Comparative Example

The conventional additive manufacturing technique for manufacturing tungsten objects is Selective Laser Melting (SLM). The particle size of the tungsten particles that can be used in SLM are between 20 and 40 μm (Fisher numbers).

Tungsten objects obtained using SLM were analyzed. The objects had a surface roughness that was visible to the naked eye.

Example

A homogeneous powder mixture of 50 wt % tungsten particles (W) and 50 wt % tungsten oxide ($WO_3$) particles was prepared.

The tungsten particles were obtained from H. C. Stark, Germany, grade HC 400, being 99.95 wt % pure and having a Fisher number of 4±0.2 μm.

The tungsten oxide particles, also obtained from H. C. Stark, Germany, was carbide grade milled blue $WO_3$, being 99.6 wt % pure and having a Fisher number of 1.2-1.8 μm.

The powder mixture was pressed into a compressed body which was heated in a first oven under a reducing atmosphere consisting of 7% $H_2$ and 93% $N_2$ from 20° C. to 750° at a rate of 200° C./hr, followed by a dwell time of 4 hours at 750° C. Subsequently, the body was heated to 900° at a rate of 200° C./hr, followed by a dwell time of 3 hours at 900° C.

The thus obtained body was sintered in another oven by heating to 1700° at a rate of 20° C./min under a reducing atmosphere consisting of 100% $H_2$, followed by a dwell time of 1 hour at 1700° C. Subsequently, the tungsten object was cooled to ambient temperature at a rate of 25° C./min and subjected to SEM and EDS analysis (in a JEOL JSM-6010LA).

FIG. 1 depicts an EDS spectrum of the tungsten object obtained showing that all tungsten oxide had been converted to tungsten.

Figure 2:
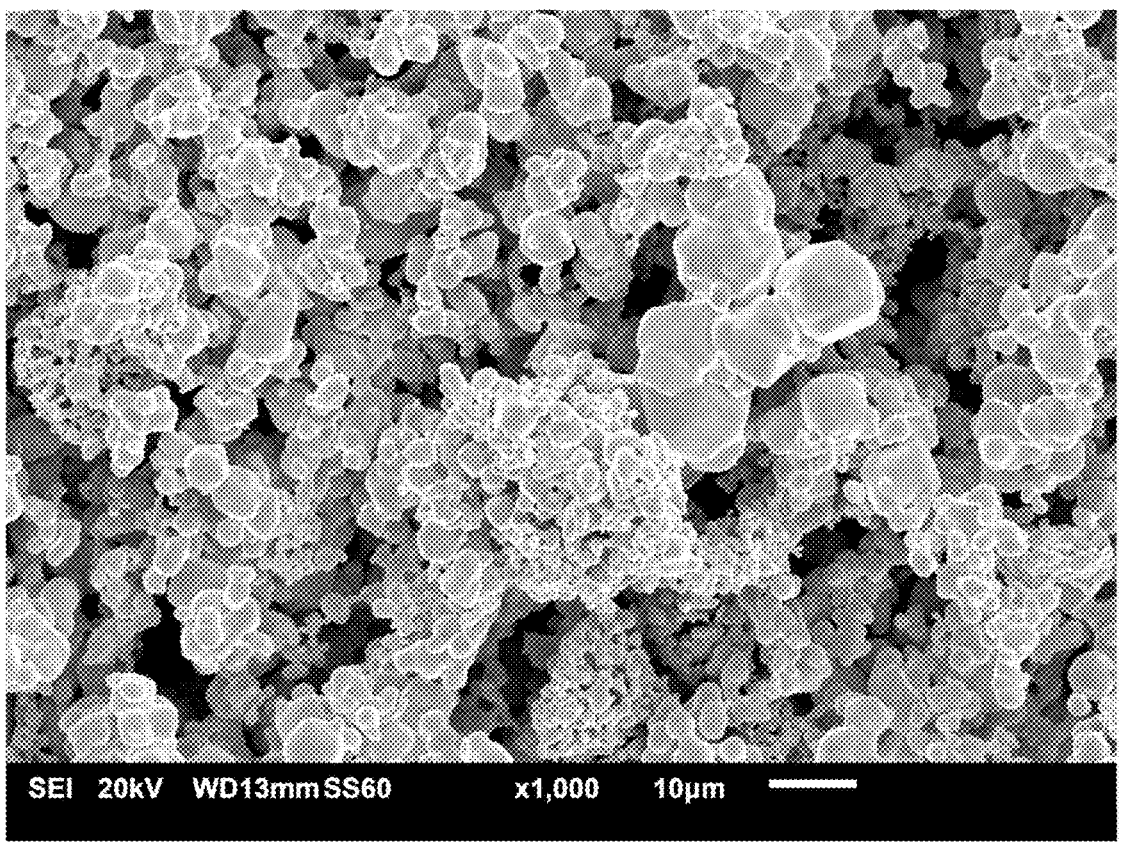
FIG. 2 depicts a SEM picture of a tungsten object obtained using a method representing the method according to the invention.

FIG. 2 depicts a SEM picture of the tungsten object obtained, showing a homogeneous structure of smaller tungsten particles originating in tungsten oxide and larger particles originating in tungsten.

The tungsten object obtained had a very homogeneous structure and a very low surface roughness which was much lower than the surface roughness of tungsten objects obtained using SLM.

The advantageous features of the tungsten object obtained in this example are characteristic of the features of tungsten objects obtained in accordance with the additive manufacturing method according to the invention since the chemistry of the metal and metal precursor is identical.

The invention claimed is:

1. An additive manufacturing method for producing a three-dimensional metal object, comprising:
   (a) providing a CAD model of the three-dimensional metal object, dividing the object in layers and the layers in voxels;
   (b) applying a first layer of radiation-curable slurry as a layer to be processed onto a target surface, wherein the radiation-curable slurry comprises, based on the weight of the slurry:
      (i) 2-45 wt % of a polymerizable resin;
      (ii) 0.001-10 wt % of one or more polymerization photoinitiators;
      (iii) 55-98 wt % of a mixture of metal-containing compounds, comprising, based on the weight of the mixture:
         (A) 5-95 wt % of metal particles; and
         (B) 5-95 wt % of one or more metal precursors;
   (c) scanning voxels of the first layer of radiation-curable slurry with radiation in accordance with the CAD model to cause polymerization of the polymerizable resin in the radiation-curable slurry to an organic binder;
   (d) applying a subsequent layer of the radiation-curable slurry as a layer on top of the first layer;
   (e) scanning voxels of the subsequent layer of radiation-curable slurry with radiation in accordance with the CAD model to cause polymerization of the polymerizable resin in the radiation-curable slurry to an organic binder;
   (f) repeating steps (d) and (e), wherein each time a subsequent layer is applied onto the previous layer to produce a green body;
   (g) removing the organic binder from the green body to obtain a brown body; and
   (h) converting any remaining metal precursor in the brown body to the corresponding metal.

2. The method according to claim 1, wherein the converting is performed by heating, heating under vacuum, heating followed by electro-deoxidation, reduction with hydrogen gas, or combinations thereof.

3. The method according to claim 1, further comprising (i) sintering the brown body of step (g) or (h).

4. The method according to claim 1, wherein the thickness of the first and subsequent layers of slurry is between 5 and 300 μm.

5. The method according to claim 4, wherein the thickness of the first and subsequent layers of slurry is between 6 and 200 μm.

6. The method according to claim 1, wherein the radiation is chosen from the group consisting of actinic types of radiation.

7. The method according to claim 6, wherein the radiation is UV-radiation.

8. The method according to claim 1, wherein the mixture of metal-containing compounds comprises, based on the weight of the mixture:
   (A) 45-95 wt % of metal particles; and
   (B) 5-55 wt % of one or more metal precursors.

9. The method according to claim 1, wherein the metal in the metal particles is selected from the group consisting of oxides of beryllium, boron, magnesium, aluminium, silicon, scandium, titanium, vanadium, chromium, manganese, iron, cobalt, nickel, copper, zinc, germanium, yttrium, zirconium, niobium, molybdenum, hafnium, tantalum, tungsten, lanthanides, actinides, combinations thereof, and metal alloys thereof.

10. The method according to claim 9, wherein the lanthanides are selected from lanthanum, cerium, praseodymium, neodymium, or samarium.

11. The method according to claim 9, wherein the actinides are selected from actinium, thorium, protactinium, uranium, neptunium, or plutonium.

12. The method according to claim 11, wherein the one or more metal precursors are selected from the group consisting of beryllium, boron, magnesium, aluminium, silicon, scandium, titanium, vanadium, chromium, manganese, iron, cobalt, nickel, copper, zinc, germanium, yttrium, zirconium, niobium, molybdenum, hafnium, tantalum, tungsten, lanthanides, actinides, and combinations thereof.

13. The method according to claim 11, wherein the lanthanides are selected from lanthanum, cerium, praseodymium, neodymium, or samarium.

14. The method according to claim 11, wherein the actinides are selected from actinium, thorium, protactinium, uranium, neptunium, or plutonium.

15. The method according to claim 1, wherein the one or more metal precursors are selected from the group consisting of metal oxides, metal hydroxides, metal sulfides, metal halides, organometallic compounds, metal salts, metal hydrides, metal-containing minerals and combinations thereof.

16. The method according to claim 15, wherein the one or more metal precursors are selected from the group consisting of metal oxide, organometallic compounds, metal hydrides and combinations thereof.

17. The method according to claim 16, wherein the one or more metal precursors are metal oxides chosen from the group consisting of $WO_3$, NiO, $MoO_3$, ZnO and MgO.

18. The method according to claim 16, wherein the one or more metal precursors are organometallic compounds selected from the group consisting of metal carboxylates, acetates, formates, hydrates thereof and combinations thereof.

19. The method according to claim 18, wherein the organometallic compounds selected from the group consisting of $Mg(CH_3COO)_2$, $Mg(CH_3COO)_2 \cdot 4H_2O$, $Fe(COOH)_3$, $Fe(COOH)_3 \cdot H_2O$, $Al(OH)(CH_3COO)_2$, $Al(OH)(CH_3COO)_2 \cdot H_2O$, $Cu(CH_3COO)_2$, $Cu(CH_3COO)_2 \cdot H_2O$, $Co(CH_3COO)_2$, $Co(CH_3COO)_2 \cdot H_2O$, $Co(CH_3CO)_2$, $Zn(CH_3COO)_2$, $Zn(CH_3COO)_2 \cdot 2H_2O$, $Zn(COOH)_2$, $Zn(COOH)_2 \cdot 2H_2O$, $Pb(CH_3COO)_2$, $Pb(CH_3COO)_2 \cdot 2H_2O$, $Ti(C_5H_7O_2)_4$, $Ti[OCH(CH_3)_2]_4$ and combinations thereof.

20. The method according to claim 16, wherein the one or more metal precursors are metal hydrides selected from the group consisting of titanium hydride, zirconium hydride, magnesium hydride, vanadium hydride, tantalum hydride, hafnium hydride and combinations thereof.

21. The method according to claim 1, wherein the one or more metal precursors are metal precursor particles.

22. The method according to claim 1, wherein the mixture of metal-containing compounds comprises a single metal and wherein the metal particles and metal precursor are selected from one of the following combinations:
(a) Ti metal particles and $TiH_2$ metal precursor particles;
(b) Ti metal particles and titanium(IV)acetylacetonate metal precursor;
(c) Ti metal particles and titanium alkoxide metal precursor;
(d) W metal particles and $WO_3$ metal precursor particles;
(e) Ta metal particles and $TaH_5$ metal precursor particles; or
(f) Hf metal particles and $HfH_2$ metal precursor particles.

23. The method according to claim 22, wherein the mixture of metal-containing compounds comprises a single metal and wherein the metal particles and metal precursor are selected from W metal particles and $WO_3$ metal precursor particles.

24. The method according to claim 1, having a viscosity measured at 20° C. at a shear rate between 10 $s^{-1}$ and 100 $s^{-1}$ using a plate-plate rheometer between 0.01 and 50 Pa·s measured in accordance with ASTM D2196-15.

25. The method according to claim 24, wherein the viscosity is between 0.05 and 40 Pa·s.

* * * * *